United States Patent
Kawamoto et al.

(10) Patent No.: US 7,185,095 B2
(45) Date of Patent: *Feb. 27, 2007

(54) NETWORK SYSTEM, NETWORK SERVER AND TERMINAL DEVICE

(75) Inventors: Youji Kawamoto, Tokyo (JP); Isao Hidaka, Tokyo (JP); Tomohiro Tsunoda, Tokyo (JP)

(73) Assignee: Sony Corporation (JP)

( * ) Notice: Subject to any disclaimer, the term of this patent is extended or adjusted under 35 U.S.C. 154(b) by 130 days.

This patent is subject to a terminal disclaimer.

(21) Appl. No.: 11/107,655

(22) Filed: Apr. 15, 2005

(65) Prior Publication Data

US 2005/0198135 A1 Sep. 8, 2005

Related U.S. Application Data

(63) Continuation of application No. 09/523,583, filed on Mar. 10, 2000, now Pat. No. 6,889,246.

(30) Foreign Application Priority Data

Mar. 12, 1999 (JP) ............................... P11-067193

(51) Int. Cl.
G06F 15/173 (2006.01)

(52) U.S. Cl. ..................... 709/225; 709/204; 709/229

(58) Field of Classification Search ................ 709/203, 709/204, 213–216, 246, 249, 232, 250, 225, 709/229
See application file for complete search history.

(56) References Cited

U.S. PATENT DOCUMENTS

| | | | | |
|---|---|---|---|---|
| 5,418,837 A | * | 5/1995 | Johansson et al. | 455/558 |
| 5,557,659 A | * | 9/1996 | Hyde-Thomson | 379/88.13 |
| 6,018,654 A | * | 1/2000 | Valentine et al. | 455/414.4 |
| 6,138,158 A | * | 10/2000 | Boyle et al. | 709/225 |
| 6,161,008 A | * | 12/2000 | Lee et al. | 455/415 |
| 6,216,157 B1 | * | 4/2001 | Vishwanath et al. | 709/208 |
| 6,230,002 B1 | * | 5/2001 | Floden et al. | 455/411 |
| 6,256,513 B1 | * | 7/2001 | Minamida | 455/557 |
| 6,333,919 B2 | * | 12/2001 | Gaffney | 370/254 |
| 6,373,946 B1 | * | 4/2002 | Johnston | 380/211 |
| 6,387,027 B1 | * | 5/2002 | Bodin | 455/419 |
| 6,473,805 B2 | * | 10/2002 | Lewis | 709/246 |

* cited by examiner

*Primary Examiner*—Saleh Najjar
*Assistant Examiner*—Liang-che Alex Wang
(74) *Attorney, Agent, or Firm*—Lerner, David, Littenberg, Krumholz & Mentlik, LLP

(57) ABSTRACT

A network system, a network server and a terminal device, capable of easily and surely transmitting various information to a user being the destination of the information. The terminal device to be used by a user is recorded in the network server 22. The network server 22 converts information to be transmitted to the terminal device used by the user into information conformed to the terminal device used by the user, or transmits a notice to the terminal device to the effect that there is information to be transmitted to said user. Thereby, the information can be easily and surely transmitted to the user who is the destination of the information.

1 Claim, 15 Drawing Sheets

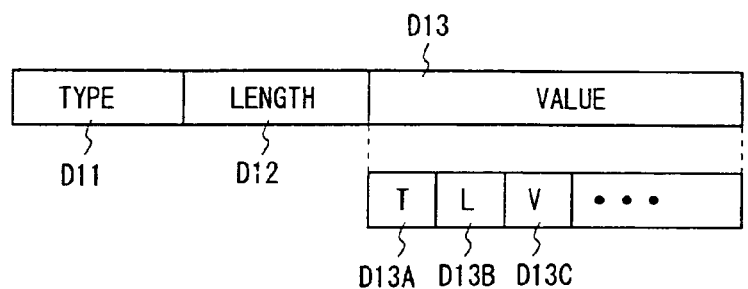

00 : NETWORK CONNECTION INFORMATION AUTHENTICATION ID, PASSWORD···
01 : NETWORK ADDITIONAL INFORMATION GROUP ID, PASSWORD···
02 : PERSONAL INFORMATION TELEPHONE DIRECTORY DATA, ADDRESS BOOK DATA, SCHEDULE DATA···
03 : EACH TERMINAL INFORMATION TELEVISION, PC, TERMINAL ATTRIBUTE OF CELLULAR PHONE OR THE LIKE, TEXT, STATIC IMAGE, DYNAMIC IMAGE, SOUND, MEDIA ATTRIBUTE OF MUSIC OR THE LIKE, FORMAT SUCH AS HTML, GIF, JPEG, MPEG, MP3, ATRAC, ETC.
04 : ADDITIONAL INFORMATION

FIG. 4

NETWORK SYSTEM, NETWORK SERVER AND TERMINAL DEVICE

This is a continuation of prior application Ser. No. 09/523,583 filed Mar. 10, 2000.

BACKGROUND OF THE INVENTION

1. Field of the Invention

The present invention relates to a network system, a network server and a terminal device, and is applicable to the network system, network server and terminal device with that plural users transfer information via the network.

2. Description of the Related Art

Heretofore, there is a system for transferring various information between plural terminal devices via a network. In this network system, a user himself connects to the network using a terminal device to transfer information with a user who operates another terminal device.

In this case, the information such as an e-mail sent from the user who operates that other terminal device is temporary stored in a network server. The user being the destination can read out the e-mail from the sender by accessing to the network server from the terminal device being the destination of the above e-mail.

In the above network system, however, the user receives the information such as e-mail stored in the network server by connecting the terminal device to the network. Accordingly, the user must confirm whether or not there is the information such as e-mail directed to him, by connecting the terminal device to the network every time.

SUMMARY OF THE INVENTION

In view of the foregoing, an object of this invention is to provide a network system, a network server and a terminal device that can easily and surely transmit various information to a user being the destination of the information.

The foregoing object and other objects of the invention have been achieved by the following manner. A terminal device to be used by a user is recorded in a network server. The network server converts information to be transmitted to the terminal device used by the user into information conformed to the terminal device used by the user, or a notice is transmitted to the terminal device to the effect that there is information to be transmitted to said user. Thereby, the information can be easily and surely transmitted to the user being the destination of the information.

Moreover, a group of plural users is formed, and information to be transferred in the above group is converted into information conformed to a terminal device used by each user who belongs to the group, or a notice is transmitted to the terminal device used by each user belonging to the group to the effect that there is information to be transmitted to said each user. Thereby, the information can be easily and surely transferred in the group.

According to the present invention as described above, a terminal device to be used by a user is recorded in a network server. The network server converts information to be transmitted to the terminal device used by the user into information conformed to the terminal device used by the user, or transmits a notice to the terminal device to the effect that there is information to be transmitted to said user. Thereby, the information can be easily and surely transmitted to the user who is the destination of the information.

Moreover, a group of plural users is formed, and the information to be transferred in the above group is converted into information conformed to a terminal device used by each user who belongs to the group, or a notice is transmitted to the terminal device used by each user belonging to the group to the effect that there is the information to be transmitted to said each user. Thereby, the information can be easily and surely transferred in the group.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a schematic diagram showing the internal format of the memory card;

DETAILED DESCRIPTION OF THE EMBODIMENT

Figure 1:
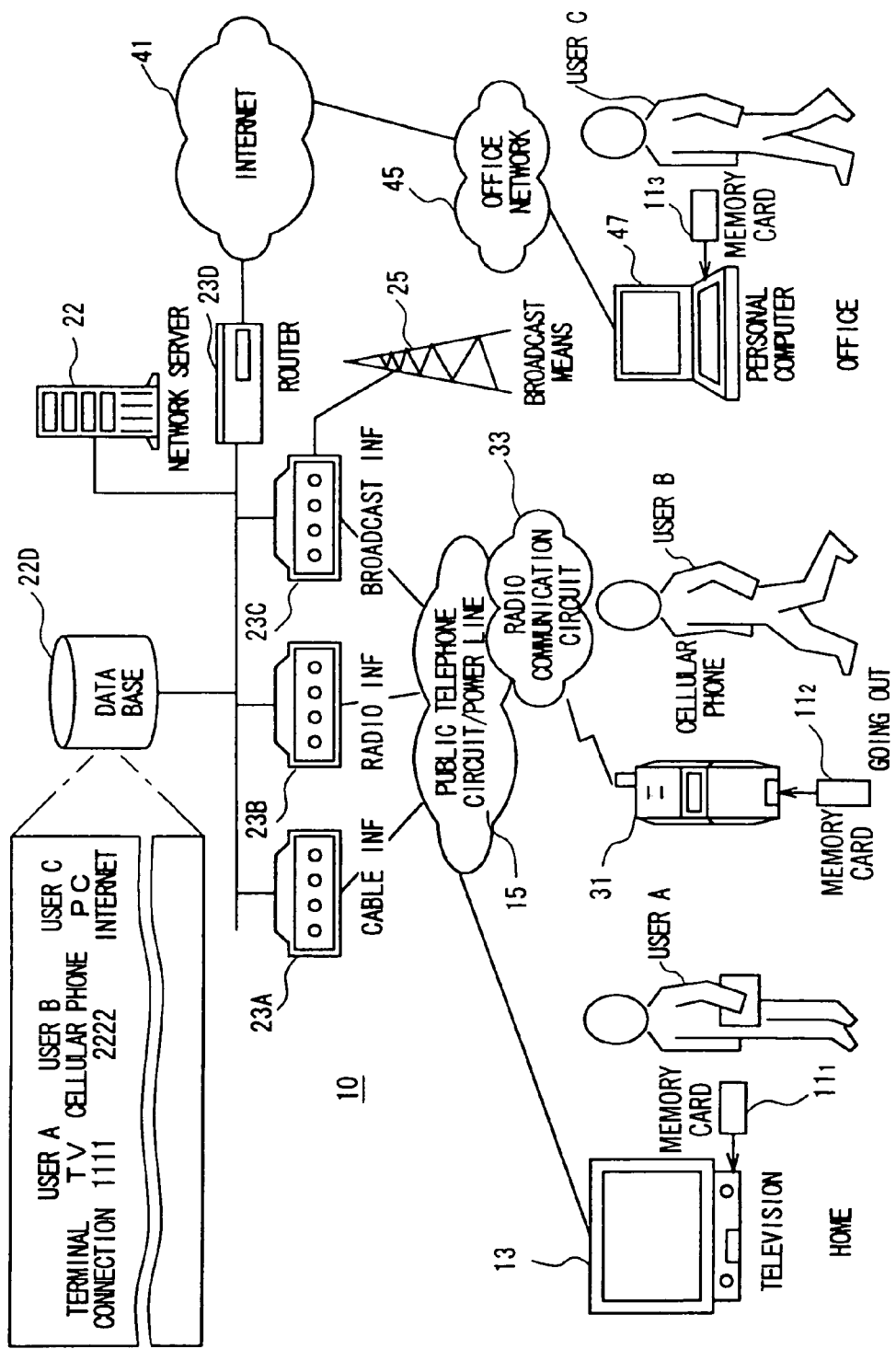
FIG. 1 is a block diagram showing the entire structure of a network system according to the present invention.

Preferred embodiments of the present invention will be described with reference to the accompanying drawings:

Referring to FIG. 1, 10 generally shows a network system. A network server 22 in the system is connected to a telephone line 15, a cellular phone line 33 and broadcast means 25 via a cable interface (INF) 23A, a radio interface 23B and a broadcast interface 23C.

A television set 13 which is a terminal device is connected to the telephone line 15 via a modem. The television set 13 can access to the network server 22 via the telephone line 15. On the other hand, a cellular phone 31 is connected to the cellular phone line 33. The cellular phone 31 can access to the network server 22 via the cellular phone line 33.

In addition to this, the network server 22 is connected to an internet 41 via a router 23D. A personal computer 47 is connected to a network 45 for example that is constructed by a local area network (LAN) in an office or the like and connected to the above internet 41 by a dedicated line. Thereby, the personal computer 47 can access to the network server 22 via the internet 41.

Figure 2:
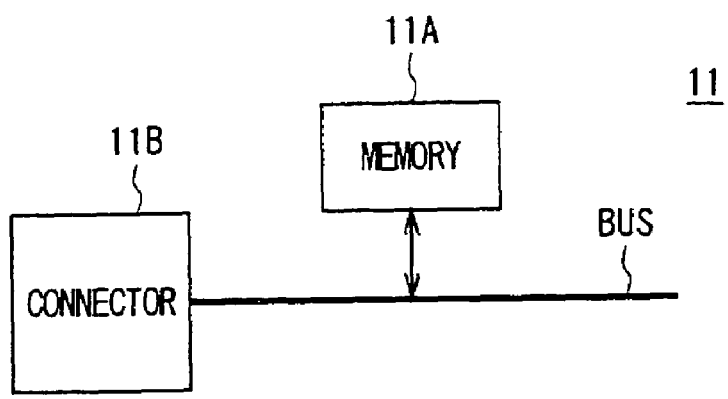
FIG. 2 is a block diagram showing the configuration of a memory card.

Here, each terminal device (television set 13, cellular phone 31 and personal computer 47) has a slot to insert a memory card $11_x$ ($11_1$, $11_2$, $11_3$, ...) being storage means. When operating these terminal devices, the user inserts the memory card $11_x$ ($11_1$, $11_2$, $11_3$, ...) that is individually owned by him in the above operating terminal. As shown in FIG. 2, the memory card $11_x$ ($11_1$, $11_2$, $11_3$, ...) is composed of a connector 11B to connect to the slot of each terminal device and a memory 11A that is connected to the above connector 11B via a bus BUS.

Figure 3:
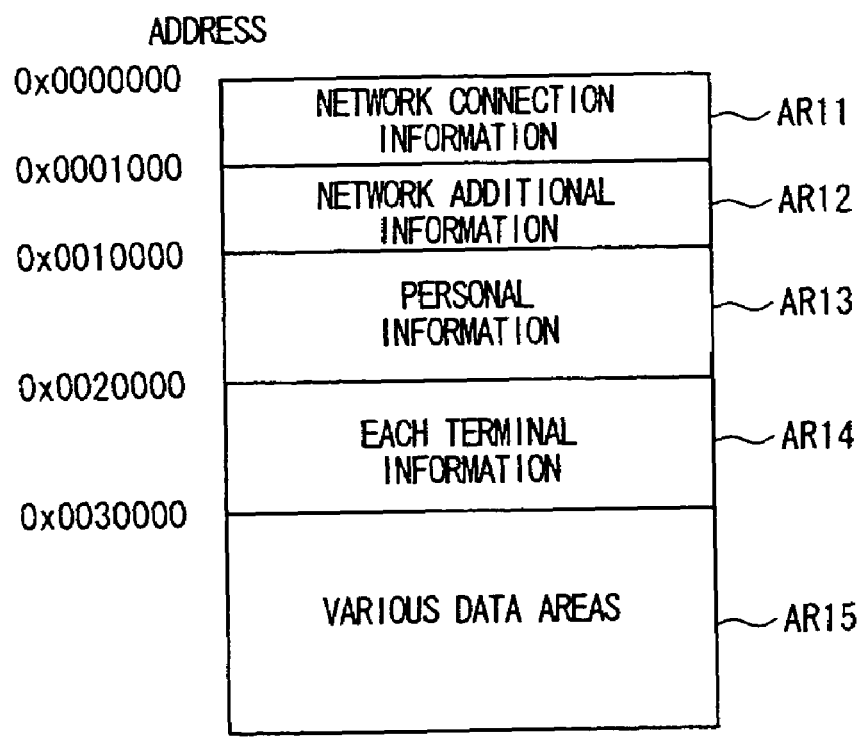
FIG. 3 is a schematic diagram showing the memory map of the memory card.

The memory 11A stores various information particular to the user who owns the above memory card $11_x$ in an area designated by a memory map shown in FIG. 3. That is, in the storage area of this memory 11A, a first area AR11 is an area to store network connection information to connect the terminal device to insert the memory card $11_x$ to the network. A user ID and a password to receive authentication from the network server 22 and a password for user identification that has been previously recorded by the user using the memory card $11_x$ or the like are stored in that area. The password for user identification is information that will be compared with a password that will be entered by the user every time when he inserts the memory card $11_x$ in the terminal device, and is used to determine whether or not the user at this time is the regular user allowed to use the memory card $11_x$.

A second area AR12 is an area to store additional information that will be downloaded for example when receiving various services (information provision or the like) on the network from the network server 22 by using the terminal device having the memory card $11_x$.

A third area AR13 is an area to store information particular to the user owing the memory card $11_x$, such as an address book or schedule data or the like.

A fourth area AR 14 is an area to store information that can be used in each terminal device having the memory card $11_x$. For example, a telecast list or uniform resource locator (URL) information to see a description of each television program on the world wide web (WWW) that will be used when the terminal device having it is the television set 13, a sentence in editing or a screen or a program on development that will be read or written when the terminal device having the memory card $11_x$ is the personal computer 47, data of character mail service transmitted or received when the terminal device having the memory card $11_x$ is the cellular phone 31, etc., will be stored respectively.

And a fifth area AR15 is an area to store various data such as a static image or the like.

The above data stored in the memory 11A of the memory card $11_x$ is stored in a type length value (TLV) format shown in FIG. 4, for example. This format is the format of the data to be stored in each area (AR11 to AR15) of the memory map described above with reference to FIG. 3. And it is composed of type information (TYPE) D11, data length information (LENGTH) D12 and content information (VALUE) D13 of the data to be stored, in each area (AR11 to AR15).

In this case, a code "00" which means network connection information is assigned as the type information D11 of the data in the first area AR11 of the memory 11A, and information such as an authentication ID (user ID) and a password or the like is stored as the content information D13 in the above first area AR11. Then, a TLV format is further formed for each authentication ID and password stored as the content information D13. The content information D13 is composed of type information D13A, data length information D13B and content information D13C respectively.

In the second area AR12 of the memory 11A, a code "01" which means the network additional information is assigned as the type information D11 of the data, and information such as a group ID that is the additional information that will be downloaded from the network server 22 when receiving various services (information provision or the like) on the network and its password or the like is stored as the content information in the above second area AR12. The group ID is identification information to be used when a specific group of plural users who use a terminal is formed. Then, a TLV format is further formed for each group ID and its password stored as the content information D13. The content information D13 is composed of the type information D13A, data length information D13B and content information D13C respectively.

In the third area AR13 of the memory 11A, a code "02" which means the personal information is assigned as the type information D11 of the data, and information such as a telephone directory, address book data and personal schedule data or the like that are the information to be peculiarly used by the user who owns the above memory card $11_x$ is stored as the content information in the above third area AR13. Then, a TLV format is further formed for each telephone directory, address book data and personal schedule data stored as the content information D13. The content information D13 is composed of the type information D13A, data length information D13B and content information D13C respectively.

In the fourth area AR14 of the memory 11A, a code "03" which means the information on each terminal is assigned as the type information D11 of the data, and information such as various terminal attribute or the like that will be used in each terminal device that is an object to insert the above memory card $11_x$ is stored as content information in the above fourth area AR14. Then, a TLV format is further formed for each information such as various terminal attribute or the like stored as the content information D13. The content information D13 is composed of the type information D13A, data length information D13B and content information D13C respectively.

And in the fifth area AR15 of the memory 11A, various data which will be arbitrary read or written is stored as the type information D11 of the data. Then, a TLV format is further formed for each this various data stored as the content information D13. The content information D13 is composed of the type information D13A, data length information D13B and content information D13C respectively.

In this manner, in the memory card $11_x$, peculiar information (authentication ID, password, etc.) to specify the user who owns the above memory card $11_x$ (user A, user B, user C, ...) and various information to be individually used by said user (personal information, each terminal information, etc.) are stored. When operating each terminal device, the user inserts the memory card $11_x$ in the operating terminal, and notifying the network connection information (authentication ID, password, etc.) which is peculiar information to specify the user himself to the network server 22 via the operating terminal. Thereby, a correspondence relationship between the terminal device operated by the user at this time and the user is recorded in the network server 22.

Figure 5:
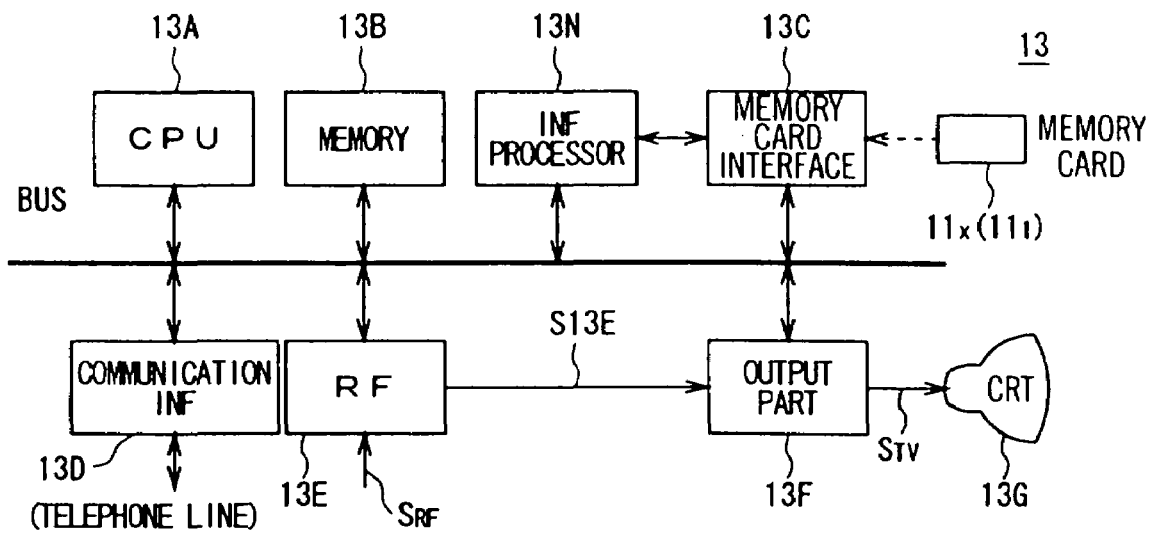
FIG. 5 is a block diagram showing the configuration of a television set.

As a first terminal device, as shown in FIG. 5, the television set 13 has a configuration in which a CPU 13A, a memory 13B, a memory card (MC) interface (INF) 13C, an interface processor 13N, a communication interface (INF) 13D, a receiving circuit (RF) 13E and an output part 13F are connected to a data bus BUS. The CPU 13A executes various operations according to an operation program stored in the memory 13B and controlling each circuit based on the above operation.

The radio frequency (RF) part 13E receives television broadcast wave $S_{RF}$ received with an antenna (not shown), and transmits a receiving signal S13E obtained by the above receiving to the output part 13F. The output part 13F generates a television video signal $S_{TV}$ by subjecting intermediate frequency (IF) amplifying processing, video detecting processing or the like to the receiving signal S13E, and transmits this to a cathode ray tube display (CRT) 13G. Thus, television broadcasting received by the RF part 13E is visibly displayed on the display screen of the CRT 13G.

Here, if for example the user A who is operating the television set 13 inserts the memory card $11_1$ owned by him into a memory card slot (not shown), the detecting contact of the memory card 11 is connected to the contact of the memory card interface 13C, and the interface processor 13N detects a change of a signal level for memory card detection (change from logic "L" level to logic "H" level). And an interrupt signal is transmitted to the CPU 13A and interrupt processing is performed. Thereby, the CPU 13A detects the insertion of the memory card $11_1$. In this connection, the interface processor 13N is a processing block which performs protocol processing according to the interface specification when in transferring data to the memory card $11_1$. Therefore, the interface processor 13N gets into a state where it can read the information peculiar to the user stored in the memory card $11_1$.

The memory card interface 13C is formed by a serial interface, and has at least three data lines. A first data line transmits a clock signal in data transmission, a second data line transmits a status signal necessary for data transmission, and a third data line serially transmits data to be written in or read out from the memory card $11_x$.

The CPU 13A reads out data in the memory card $11_1$ via the memory card interface 13C, and transmits this to the network server 22 via the communication interface 13D and the telephone line 15 (FIG. 1) to perform authentication request of the network server 22.

Figure 6:
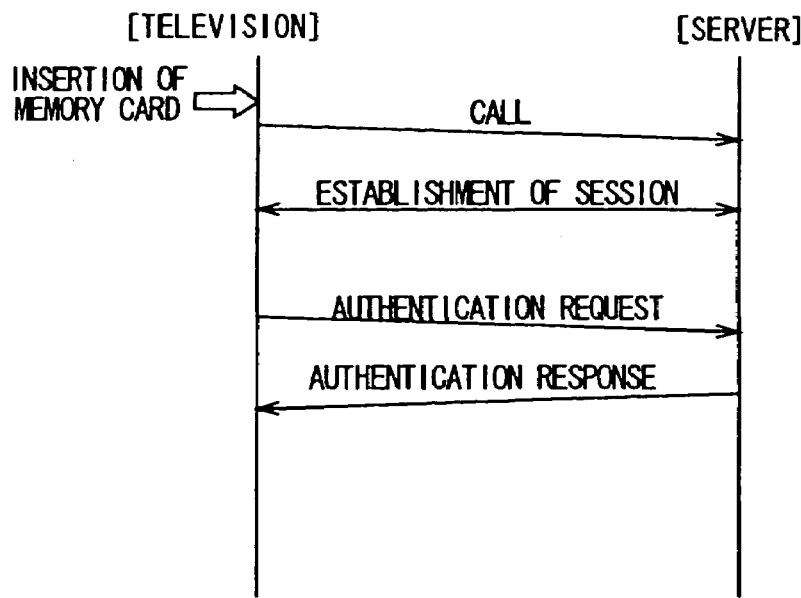
FIG. 6 is a schematic diagram showing the authentication sequence between the television set and a server.

The sequence of this authentication request is shown in FIG. 6. Referring to FIG. 6, if for example the memory card $11_1$ is inserted in the television set 13, the CPU 13A detects the insertion state of the memory card $11_1$ via the memory card interface 13C, and transmits a signal to the network server 22 via the telephone line 15 to retain a channel.

Then, after performing an establishment of a session by point to point protocol (PPP) processing, the CPU 13A of the television set 13 transmits an authentication request to the network server 22. This authentication request data D21 is specifying information to specify a user and a terminal used by said user. As the above authentication request data D21, the CPU 13A transmits, to the network server 22, information to specify the user that is composed of a user ID and a password for authentication included in the network connection information (FIG. 3) stored in the memory card $11_1$, terminal type data previously stored in the memory 13B of the television set 13 (data means television set), information to specify sending means and a communication form (wire telephone, wireless or internet, etc.) and information to specify the terminal that is composed of a calling telephone number and various option data on the television set (subnet, internet protocol (IP) address, machine name, etc.) and terminal's ability (TCP/IP, wireless application protocol (WAP)), no data communication facility, etc.).

Figure 7:
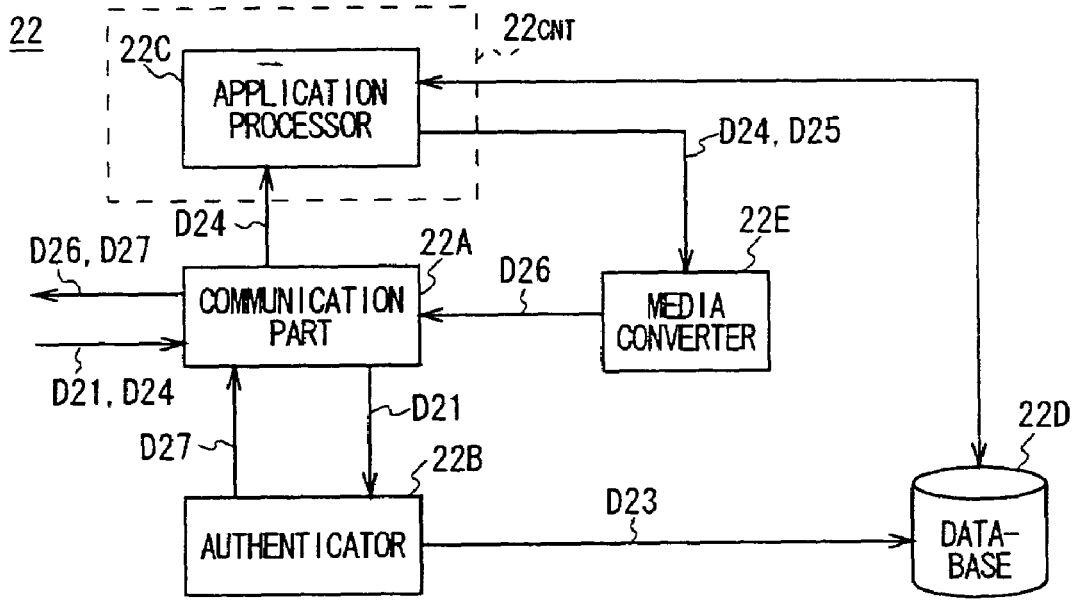
FIG. 7 is a block diagram showing the configuration of the network server.

As shown in FIG. 7, the network server 22 receives the authentication request data D21 transmitted from the television set 13 operated by the user A at this time with a communication part 22A, and supplies the above received authentication request data D21 to an authenticator 22B.

If the user ID (authentication ID) and password that are contained in the authentication request data D21 coincide with the prerecorded data of the regular user A, the authenticator 22B determines that the user A who is operating the sender of the authentication request data D21 that was entered at this time (i.e., television set 13) is the regular user. The information to specify the user contained in the authentication request data D21 (user ID and password or the like) and information for terminal specification that is to specify the terminal device operated by the user A (television set 13) (terminal type data, information to specify sending means and sending telephone number and various option data on the television set) are recorded in a database 22D as combined data of the user and the operating terminal D23. At this time, when existent combined data has been stored in the database 22D, the database 22D overwrites the new combined data D23 that is supplied from the authenticator 22B at this time on the existent combined data and updating.

Thereby, in the database 22D, at every time when the specified user operates a different terminal device, the combination of the terminal device newly operated and said user will be recorded.

If such determination being the regular user is obtained with respect to the authentication request in the authenticator 22B, the authenticator 22B replies authentication response data D27 to the terminal device operated by the user A at this time (television set 13) via the communication part 22A (FIG. 6).

Therefore, in the network server 22, the terminal device presently used by the user A (television set 13) will be registered combined with said user A. The information thus recorded in the database 22D of the network server 22 remains in the database 22D even if the terminal device used by the user is disconnected from the network server 22.

Note that, when the authentication request data D21 is transmitted from the television set 13 to the network server 22 as aforementioned with reference to FIG. 6, the authentication request data D21 may be enciphered for example by an encryption algorithm that generates one-way random patterns called MD5 etc. By transmitting thus enciphered authentication request data D21, an illegal use of the data necessary for authentication, such as user ID or password, can be prevented.

In this manner, when the user A uses the television set 13, he inserts the memory card $11_1$ owned by him in the slot of the above television set 13, and the paired peculiar information on the user A and the peculiar information on the terminal device being used at this time (e.g., television set 13) is recorded in the network server 22. Thereby, the network server 22 can grasp a place where the user A is.

In this connection, in the state where the user A has inserted the memory card $11_1$ in the television set 13, the user A performs a prescribed input operation, the CPU 13A of the television set 13 reads out the television program list or the URL information stored in the fourth area AR14 in the memory card $11_1$ described above with reference to FIGS. 3 and 4 based on the type information D11 and D13A on the data having the data structure of the TLV format, and displays them on the CRT 13G as the occasion demands. On the other hand, when the television program list or the information on URL or the like have not been stored in the above fourth area AR14, the CPU 13A sends a request to send (RS) to the network server 22, so that latest information that the network server 22 obtained from information provision means (service provider or the like) via the network can be stored. As how to store this information, the information may be periodically transmitted from the network server 22 to the television set 13 without sending the RS from the television set 13 to the network server 22.

If the user A ejects the memory card $11_1$ from the slot of the television set 13, the detecting contact of the memory card $11_1$ is detached from the contact of the slot of the memory card interface 13C. The interface processor 13N detects a change of the signal level for memory card detection (change from logic "H" level to logic "L" level), and transmits an interrupt signal to the CPU 13A to perform interrupt processing. Thereby, the CPU 13A detects the ejection of the memory card $11_1$.

Figure 8:
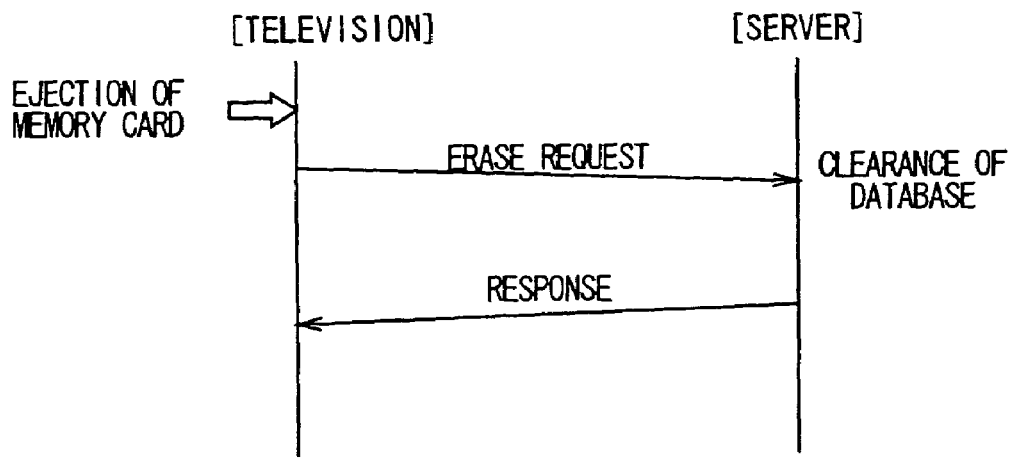
FIG. 8 is a schematic diagram showing the sequence when the memory card is ejected.

At this time, as shown in FIG. 8, the CPU 13A transmits an erase request which includes the user ID and the terminal type data (data means the type the television set 13) to the network server 22. The authenticator 22B of the network server 22 received this erases the combined data of the user A and the operating terminal (television set 13) recorded in the database 22D, and replies an answer signal to the television set 13. Thereby, the television set 13 in which the memory card $11_1$ was ejected is deleted from a record as the user's present operating terminal device (his position) in the database 22D of the network server 22.

Figure 9:
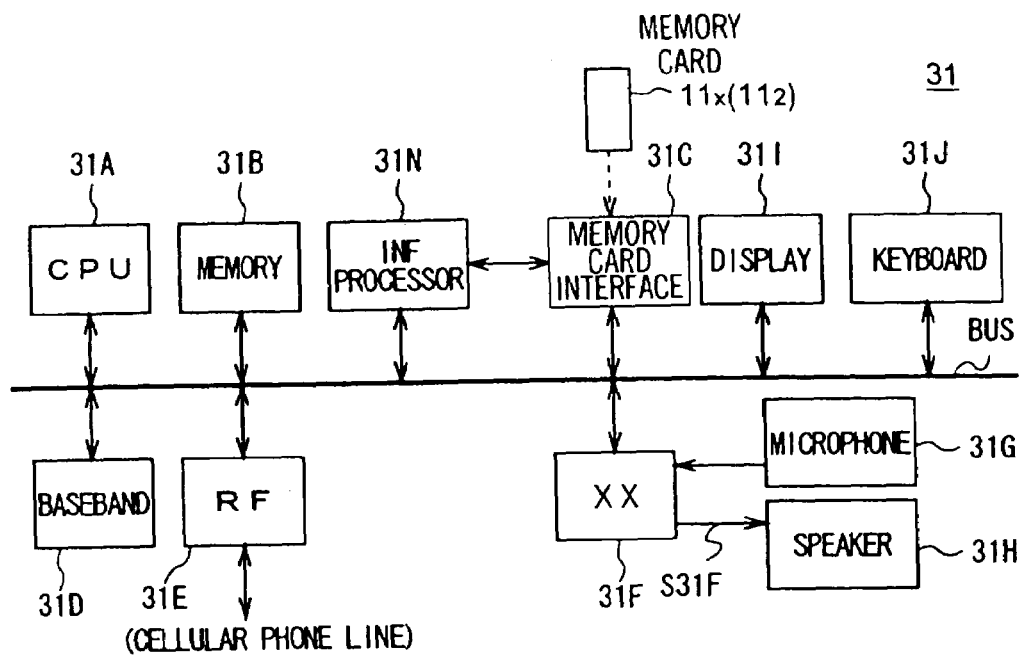
FIG. 9 is a block diagram showing the configuration of a cellular phone.

As a second terminal device, as shown in FIG. 9, the cellular phone 31 has a configuration in which a CPU 31A, a memory 31B, a memory card (MC) interface (INF) 31C, an interface processor 31N, a transmitter-receiver circuit (RF) 31E for performing send/receive of a signal with a cellular phone line 33, a baseband processor 31D for converting a radio frequency (RF) signal received by the transmitter-receiver circuit 31E into a baseband signal and besides, for converting a transmitting baseband signal into an RF signal, a man machine interface (MMI) 31F being an interface for a microphone 31G and a speaker 31H, a display 31I and a keyboard 31J are connected to a data bus BUS.

The CPU 31A executes various operations according to operation programs stored in the memory 31B and controlling each circuit corresponding to the above operation. Various processing contents by the CPU 31A will be displayed on the display 31I formed by a liquid crystal display panel or the like as the occasion demands.

If the user enters a telephone number that he wants to call on the keyboard 31J, data meaning the above telephone number is transmitted to the CPU 31A. The CPU 31A transmits a call request to the other party designated by the telephone number entered by the user via the transmitter-receiver circuit 31E. Then the line is connected via the cellular phone line 33 according to a response from the other party. If the line is connected, the transmitter-receiver circuit 31E supplies an RF signal from the other party received via an antenna (not shown) to the baseband processor 31D. Here the RF signal is converted into a baseband signal. The baseband processor 31D supplies the baseband signal obtained by the above conversion to the MMI 31F. Thus, a received speech signal from the other party is outputted from the speaker 31H as a voice.

Besides, if the user enters a voice through the microphone 31G, the MMI 31F supplies an input audio signal supplied from the microphone 31G to the baseband processor 31D. Here the baseband signal is converted into an RF signal. Then, the baseband processor 31D transmits the above converted RF signal to the cellular phone line 33 via the transmitter-receiver circuit 31E, and the above RF signal is transmitted to the other party connected by the line. Therefore, the user using the cellular phone 31 can speak or transfer various information with the other party.

Here, if the user B operating the cellular phone 31 inserts the memory card $11_2$ owned by him in a memory card slot of the cellular phone 31 (not shown), the detection contact of the memory card $11_2$ is connected to the contact of the memory card interface 31C. The interface processor 31N detects a change of the signal level for memory card detection (change from logic "L" level to logic "H" level), and transmits an interrupt signal to the CPU 31A and performing interrupt processing. Thus the CPU 31A detects the insertion of the memory card $11_2$. In this connection, the interface processor 31N is a processing block that performs protocol processing according to the interface specification when in transferring data to the memory card $11_x$. Thus, the interface processor 31N gets into the state where it can read out information peculiar to the user stored in the memory card $11_2$.

At this time, the CPU 31A reads out the data in the memory card $11_2$ via the memory card interface 31C, and transmits this to the network server 22 via the transmitter-receiver circuit 31E and the cellular phone line 33 (FIG. 1) and requesting an authentication of the network server 22.

As the sequence of this authentication request, if the memory card $11_2$ is inserted in the cellular phone 31, similarly to the authentication request sequence in the television set 13 described above with reference to FIG. 6, the CPU 31A detects the insertion state of the memory card $11_2$ via the memory card interface 31C, and sends a signal to the network server 22 via the cellular phone line 33 to retain a channel.

The CPU 31A of the cellular phone 31 establishes a session by means of information transmitting/receiving means built in the cellular phone 31 that uses the point to point protocol (PPP) processing or the wireless application protocol (WAP) or the like, and then transmits an authentication request to the specified network server 22. In this connection, if the cellular phone 31 does not have such protocol function, PPP or WAP, line connection is performed with a protocol such as the dual tone multiple frequency (DTMF) or the like.

Then, as the authentication request data D21, the CPU 31A transmits, to the network server 22, information to specify the user B that is composed of a user ID and a password for authentication in the network connection information stored in the memory card $11_2$ (FIG. 3), terminal type data previously stored in the memory 31B of the cellular phone 31 (data means cellular phone (personal digital cellular (PDC) phone), information to specify the sending means (PDC), the sending telephone number of the cellular phone 31, protocol information such as the WAP used in the connection and information to specify a terminal composed of various option data.

The network server 22 receives the authentication request data D21 sent from the cellular phone 31 operated by the user B with the communication part 22A at this time as described above with reference to FIG. 7, and supplies the above received authentication request data D21 to the authenticator 22B.

If the user ID (authentication ID) or the password contained in the authentication request data D21 coincide with the prerecorded data of the regular user B, the authenticator 22B determines that the user B operating the sender of the authentication request data D21 entered at this time (i.e., cellular phone 31) is the regular user. And the information to specify the user B contained in the authentication request data D21 (user ID and password or the like), and information for terminal specification to specify the terminal device operated by the user B (cellular phone 31) (terminal type data, information to specify the sending means, and the sending telephone number and various option data on the cellular phone) are recorded in the database 22D as combined data of the user and the operating terminal D23. At this time, if extent combined data has been stored in the database 22D, the database 22D overwrites the new combined data D23 that is supplied from the authenticator 22B at this time on the existent combined data and updating.

In this manner, in the database 22D, the use of the cellular phone 31 by the user B is recorded at this time. This record will remain in the database 22D even if the cellular phone 31 is disconnected from the network server 22.

Note that, when the authentication request data D21 is transmitted from the cellular phone 31 to the specified network server 22, the authentication request data D21 may be enciphered for example by the encryption algorithm that forms one-way random patterns called MD5 or the like. By transmitting thus enciphered authentication request data D21, illegal use of the data necessary for authentication such as user ID or password can be prevented.

When the user B uses the cellular phone 31, he inserts the memory card $11_2$ in the slot of the above cellular phone 31. And the paired information peculiar to the user and the information peculiar to the terminal device used at this time (cellular phone 31) are recorded in the network server 22. Therefore, the network server 22 can grasp the place where the user B is.

If the user B ejects the memory card $11_2$ from the slot of the cellular phone 31, the detecting contact of the memory card $11_2$ is detached from the contact of the memory card interface 31C, and the interface processor 31N detects a change of the signal level for memory card detection (change from logic "H" level to logic "L" level). An interrupt signal is transmitted to the CPU 31A according to that, and interrupt processing is performed. Thus, the CPU 31A detects the ejection of the memory card $11_2$ was ejected.

At this time, similarly to the case of the television set 13 described above with reference to FIG. 8, the CPU 31A transmits an erase request that includes the user ID and the terminal type data (data means the type the cellular phone 31) to the network server 22. The authenticator 22B of the network server 22 received this erases the combined data of the user B and his operating terminal (cellular phone 31) recorded in the database 22D, and replies a response signal to the cellular phone 31. Thereby, the cellular phone 31 from which the memory card $11_2$ has ejected is deleted from a record as the terminal device being operated by the user B (his position) in the database 22D of the specified network server 22.

In this connection, if the user B performs a prescribed input operation in the state where the user B inserted the memory card $11_2$ in the cellular phone 31, the CPU 31A of the cellular phone 31 reads out telephone directory data and address book data or the like stored in the third area AR13 in the memory card $11_2$ described above with reference to FIGS. 3 and 4 based on the type (TYPE) information D11 and D13A of the data having the data structure of the TLV format, and displays them on the display 31I as the occasion demands. On the other hand, if the telephone directory data and the address book data or the like are not stored in the above third area AR13, the CPU 13A can store various information in the above area by the input operation by the user B.

Figure 10:
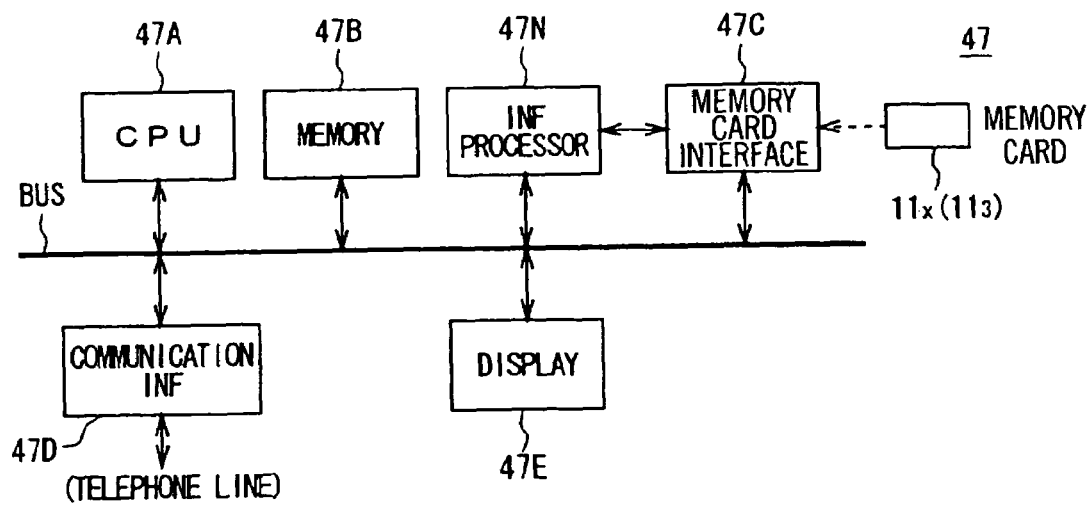
FIG. 10 is a block diagram showing the configuration of a personal computer.

On the other hand, as a third terminal device, as shown in FIG. 10, the personal computer 47 has a configuration in which a CPU 47A, a memory 47B, a memory card (MC) interface (INF) 47C, an interface processor 47N, a communication interface (INF) 47D and a display 47E are connected to a data bus BUS. The CPU 47A executes various operations according to operation programs stored in the memory 47B. Each circuit is controlled based on the above operation. The content of various processing by the CPU 47A will be displayed on the display 47E formed by a liquid crystal display panel or the like.

If the user C who is operating the personal computer 47 inserts the memory card $11_3$ owned by him in a memory card slot (not shown), the detecting contact of the memory card $11_3$ is connected to the contact of the memory card interface 47C. The interface processor 47N detects a change of the signal level for memory card detection (change from logic "L" level to logic "H" level). An interrupt signal is transmitted to the CPU 47A based on that, and interrupt processing is performed. Thereby, the CPU 47A detects the insertion of the memory card $11_3$. In this connection, the interface processor 47N is a processing block which performs protocol processing according to the interface specification when in transferring data to the memory card $11_3$. Thus, the interface processor 47N gets into the state where it can read information peculiar to the user stored in the memory card $11_3$.

At this time, the CPU 47A reads out data in the memory card $11_3$ via the memory card interface 47C, and transmits this to the network server 22 via the communication INF 47D, office network 45 and internet 41 (FIG. 1) to request an authentication of the network server 22.

In this case, since the network 45 is connected to the internet 41 by a dedicated line, the personal computer 47 connected to the above network 45 is in the state where the session to the network server 22 is being established. Therefore, if the user C inserts the memory card $11_3$ in the personal computer 47, it can enter authentication processing directly.

In this case, in the internet 41, the protocol has been determined to the transmission control protocol/internet protocol (TCP/IP). Therefore, also the authentication request from the personal computer 47 to the network server 22 is performed by the same protocol (TCP/IP).

On the other hand, if the network 45 is protected by a fire wall 46, it is needed to transmit authentication request data that includes the attribute information of the above fire wall 46 from the personal computer 47 to the network server 22. Accordingly, if the user C inserts the memory card $11_3$ in the personal computer 47, the personal computer 47 transmits information to specify a user that is composed of a user ID and a password for authentication in the network connection information (FIG. 3) stored in the memory card 113, terminal type data prestored in the memory of the personal computer 47 (data means personal computer), information to specify sending means (dedicated line), a fire wall attribute to maintain network security such as SOCKS, the internet protocol (IP) address of the personal computer 47 and information for terminal specification composed of the name of the terminal and various option data, to the network server 22 as the authentication request data.

The network server 22 receives the authentication request data D21 transmitted from the personal computer 47 that is being operated by the user C at this time with the communication part 22A as described above with reference to FIG. 7. Thus received authentication request data D21 is supplied to the authenticator 22B.

If a user ID (authentication ID) and a password or the like are contained in the authentication request data D21 coincide with prerecorded data of the regular user C, the authenticator 22B determines that the user C who is operating the sender of the authentication request data D21 entered at this time (i.e., the personal computer 47) is the regular user, and records the information to specify the user C contained in the authentication request data D21 (user ID and password or the like) and information for terminal specification to specify the terminal device operated by the user C (personal computer 47) in the database 22D as combined data of the user C and his operating terminal D23. If existent combined data has been stored in the database 22D at this time, the database 22D overwrites the new combined data D23 which is supplied from the authenticator 22B at this time on the existent combined data and updating.

Thereby, in the database 22D, the use of the personal computer 47 by the user is recorded at this time.

Note that, when the authentication request data D21 is transmitted from the personal computer 47 to the network server 22, the authentication request data D21 may be enciphered for example by the encryption algorithm that forms one-way random patterns called the MD5 or the like. By transmitting thus enciphered authentication request data D21, illegal use of the data necessary for authentication such as the user ID or the password can be prevented.

When the user C uses the personal computer 47, the memory card 11$_3$ is inserted in the slot of the above personal computer 47 by him, and the paired information of the information peculiar to the user and the information peculiar to the terminal device being used at this (personal computer 47) are recorded in the network server 22. Thus, the network server 22 can grasp his position.

If the user C ejects the memory card 11$_3$ from the slot of the personal computer 47, the detecting contact of the memory card 11$_3$ is detached from the contact of the slot of the memory card interface 47C; the interface processor 47N detects a change of the signal level for memory card detection (change from logic "H" level to logic "L" level), and transmits an interrupt signal to the CPU 47A and performing interrupt processing. Thereby, the CPU 47A detects the ejection of the memory card 11$_3$.

At this time, the CPU 47A transmits an erase request including the user ID and the terminal type data (data means the type the personal computer 47) to the network server 22, similarly to the case of the television set 13 described above with reference to FIG. 8. Receiving this, the authenticator 22B of the network server 22 deletes the combined data of the user C and the operating terminal (personal computer 47) recorded in the database 22D, and replies a response signal to the personal computer 47. Thereby, the personal computer 47 from which the memory card 11$_3$ has ejected is deleted from a record as the terminal device presently operated by the user C (his position) in the database 22D of the network server 22.

In this manner, when the plural users (user A, user B and user C) use respective desired terminal device (television set 13, cellular phone 31 or personal computer 47), they insert the memory card 11$_x$ owned by each user in the terminal device that he is going to operate, and the authentication request data is transmitted from each terminal device to the network server 22. Thus, in the network server 22, the terminal device respectively used by the plural users (i.e., users' positions) can be recognized.

In this case, the network server 22 records the users and the terminal devices used by said users in the database 22D. Therefore, even if the terminal device and the network server 22 become off-line after the completion of the authentication processing, the network server 22 can search for the terminal device used by the user (user's position) anytime.

In the state where the terminal devices respectively used by the plural users have been recorded in the network server 22 as the above, the network system 10 can form a group in which users are specified according to a group forming request by the user.

Figure 11:
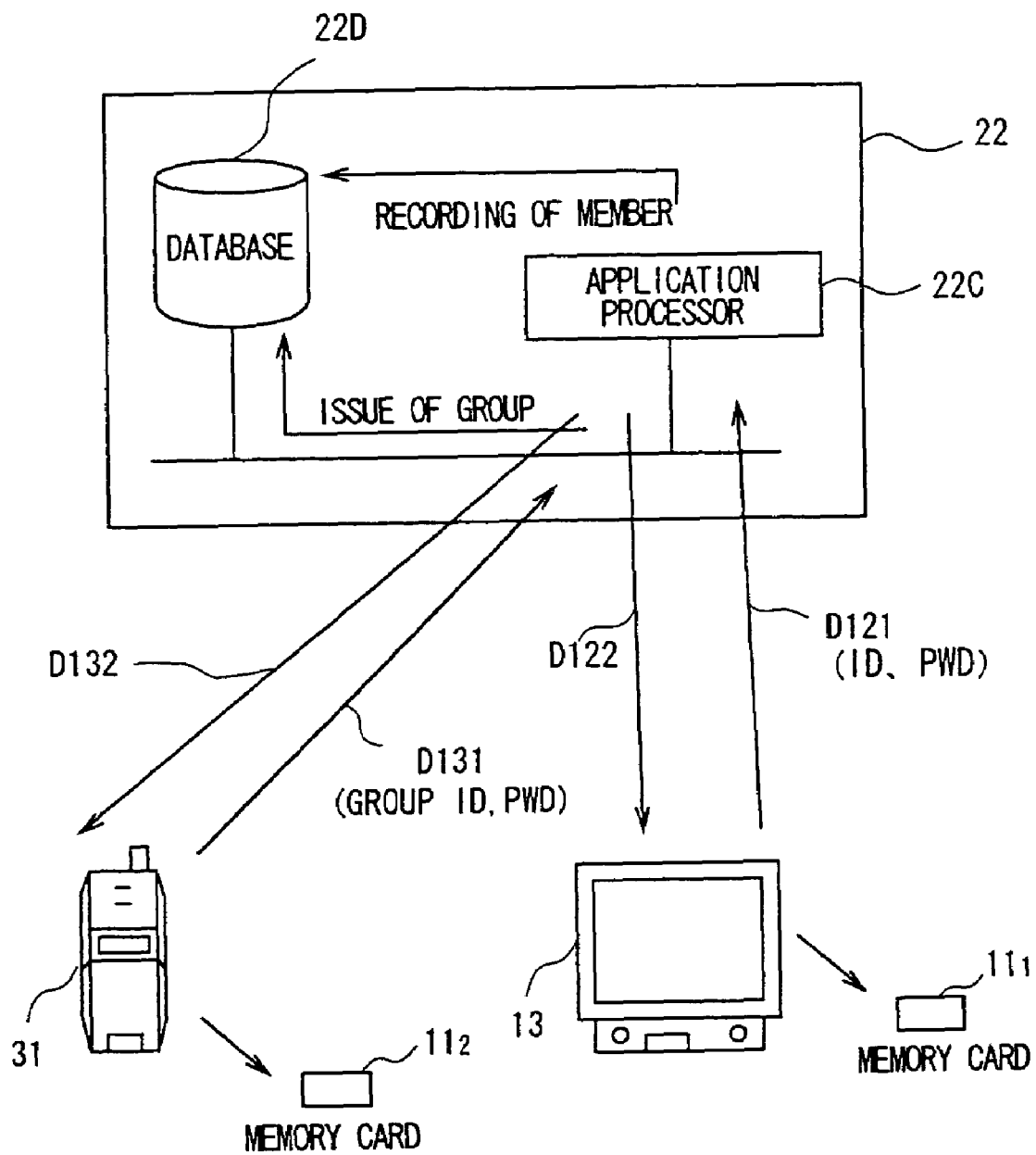
FIG. 11 is a block diagram explaining a method of forming a group.
Figure 12:
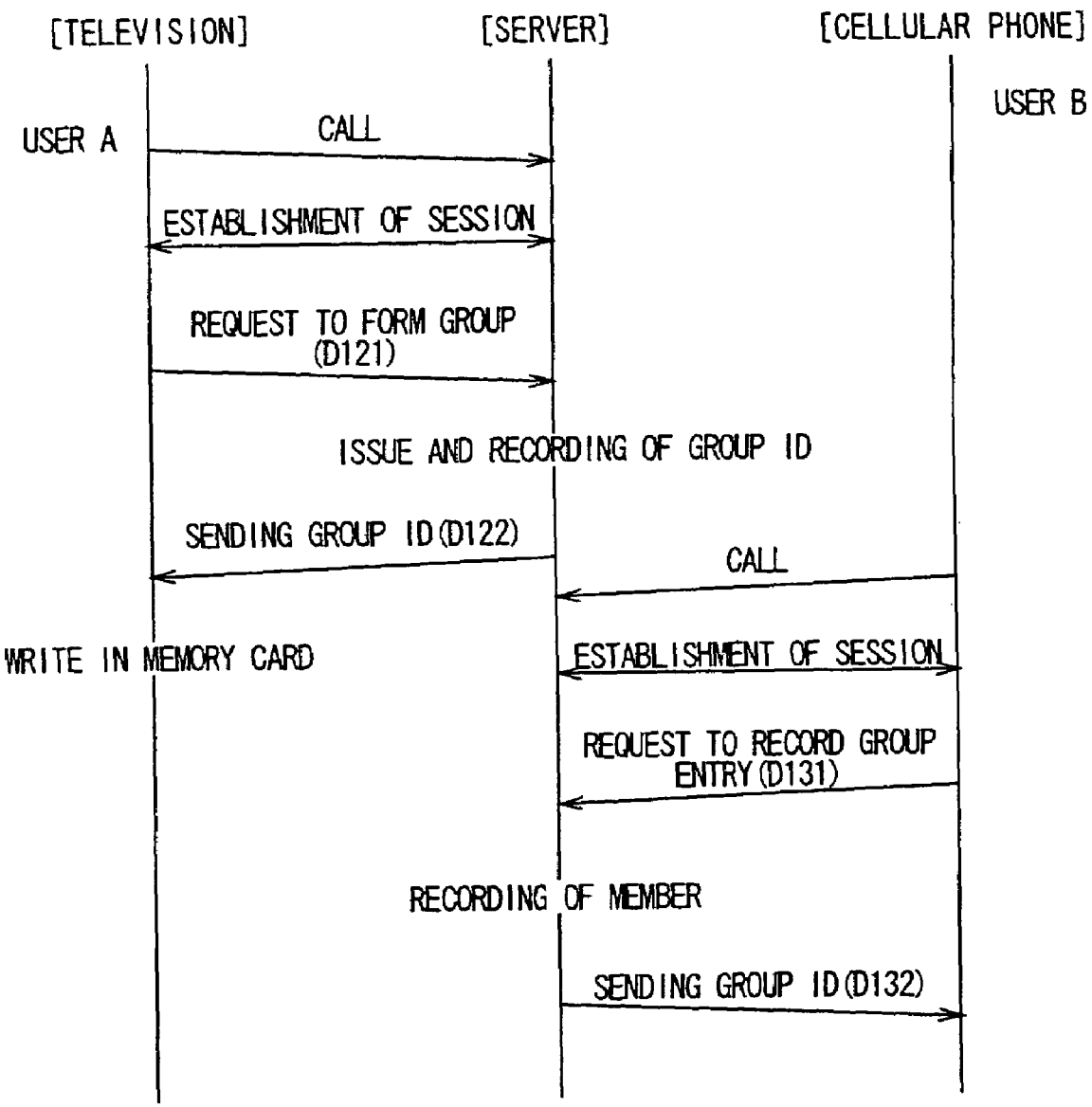
FIG. 12 is a schematic diagram showing the sequence of forming a group.

As an example of this group forming processing, FIG. 11 and 12 show the case where the user A who operates the television set 13 forms a group and the user B who operates the cellular phone 31 enters the above formed group. Referring to FIGS. 11 and 12, that is, after the user A sends a signal to the network server 22 by operating the television set 13 and the session between the television set 13 and the network server 22 is established, the user A transmits a group forming request D121 to the network server 22. In this group forming request D121, the user ID of the user A, a group ID and its password set by the user A are included.

The network server 22 that received the group forming request D121 from the television set 13 operated by the user A confirms whether or not the combination of the group ID and the password included in thus received group forming request D121 has already recorded in an application processor 22C. If the above combination is not recorded, the above group ID and its password, and the former of the above group (user A) are recorded in the database 22D.

If the recording is completed, the network server 22 transmits the group ID (D122) to the television set 13 used by the user A who is the former, to notify the forming of the group according to the request by the user A. The television set 13 which received the above notice stores the group IF receiving from the network server 22 in the second area AR12 (FIG. 3) of the memory card 11$_1$ that is being inserted at this time as the network additional information. By storing the group ID and the password of the formed group in the memory card 11$_1$ peculiar to the user A as the above, the above using terminal device is recognized by the network server 22 as a device forming the group, also in the case where the user A inserts the above memory card 11$_1$ in another terminal device and uses this terminal device.

In this connection, the group ID and the password given to the above group may be set at random in the network server 22 that formed the group according to the request by the user A. In this case, the above set group ID and password are transmitted to the user A (television set 13).

In this manner, the group formed by the user A is recorded in the network server 22. And if another user (e.g., user B) enters the above extent group recorded, the user B sends a signal from the cellular phone 31 using at this time to the network server 22 to establish the session with the network server 22.

Then, the user B transmits the group ID and the password of the group formed by the user A to the network server 22 as a group entry recording request D131. If receiving this, the network server 22 confirms whether or not the above receiving combination of the group ID and password have been recorded in the database 22D. If it is found, the network server 22 records the user B as a group member.

Then, if the entry of the user B is recorded, the network server 22 transmits the group ID (D132) recorded to entry at this time to the cellular phone 31 being used by the user B, and notifying the completion to record the entry to the group according to the request by the user B. The cellular phone 31 that received the above notice stores the group ID receiving from the network server 22 in the second area AR12 (FIG. 3) of the memory card 11$_2$ being inserted as the network additional information. Since the group ID and the password of the group to which the entry has recorded are stored in the memory card 11$_2$ peculiar to the user B, also in the case where the user B inserts the above memory card 11$_2$ in another terminal device and uses the terminal device, the above using terminal device will be recognized by the network server 22 as a device forming the group.

By the way, when a group member left from the group that he is joining in, the group member transmits a leaving request to the network server 22. Thus the application processor 22C deletes the record in the database 22D. Furthermore, disengagement (dissolution) of the group will be performed by the user A who is the former of the above group. The network server 22 receives a disengagement request only from the user A. Thereby, disengagement of the group by the third party can be prevented. Besides, also with respect to leaving of a group member, performing the leaving processing may be permitted only to the user A who is the former of the group.

Note that, FIGS. 11 and 12 have dealt with the case where the user B joined the group formed by the user A, however, also the user C who operates the personal computer 47 can join in it. Each user can arbitrary perform forming a group and joining in a group using various terminal devices.

Here, in the application processor 22C of the network server 22, notice information (message information) such as electronic mails to a specified user or the like sent from various terminal devices will be stored. In these notice information, if notice information sent to a specified group or notice information or notice information to be transferred in a specified group arrives the network server 22, the application processor 22C searches the database 22D for the user who is the destination of the above notice information and a group member, and transmits the notice information to said group member.

Figure 13:
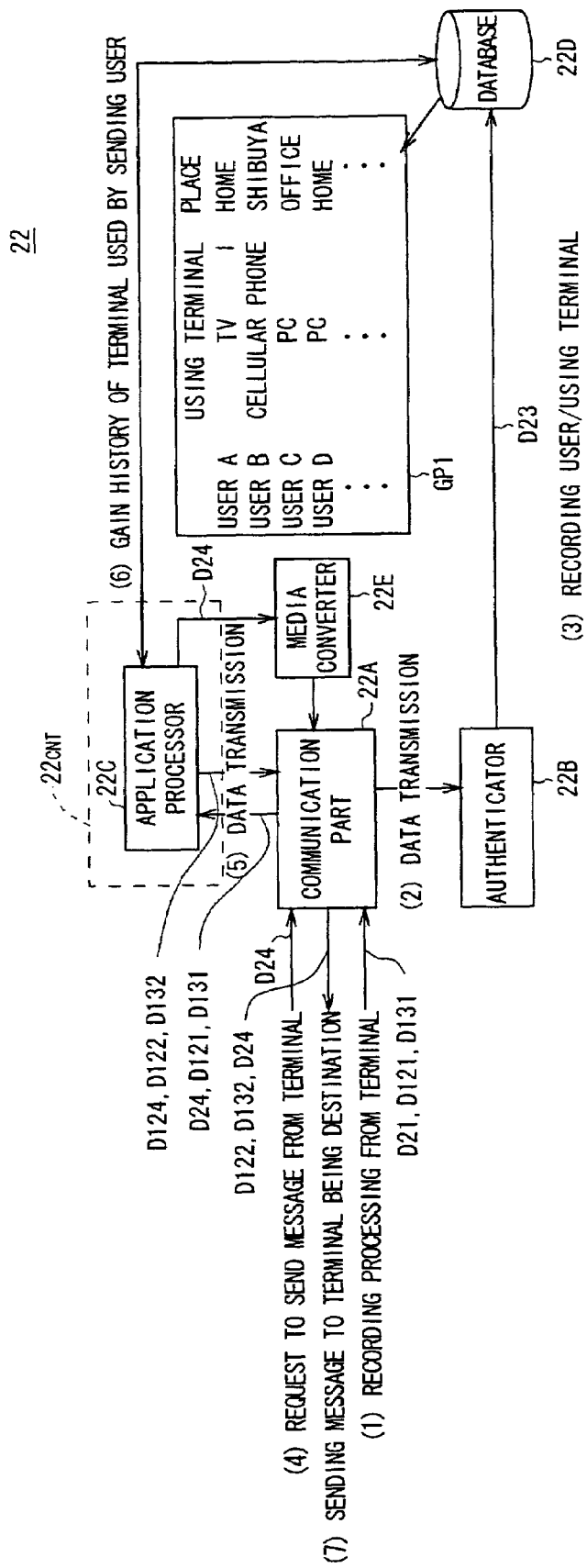
FIG. 13 is a block diagram explaining the operation to notify group members a message.

That is, as shown in FIG. 13 in which the same reference numeral is added to the corresponding part of FIG. 7, the network server 22 records the specified users according to the group forming request D121 or the entry for group request D131 (user A, user B, user C, user D, . . . ) as the group members of a group GP1, from among the combinations of users and their operating terminals recorded in the database 22D by the authentication request data D21. In the contents of this record, if the user who is a member of the group GP1 changes a using terminal device (that is, if the user inserts the memory card 11$_x$ in another terminal device), the combination of said user and his operating terminal is updated in the database 22D by the authentication processing described above with reference to FIG. 6, so that also the combination of the user recorded as the member of the group GP1 and his operating terminal is rewritten. Therefore, the record content of the above group GP1 is always the latest information.

Figure 14:
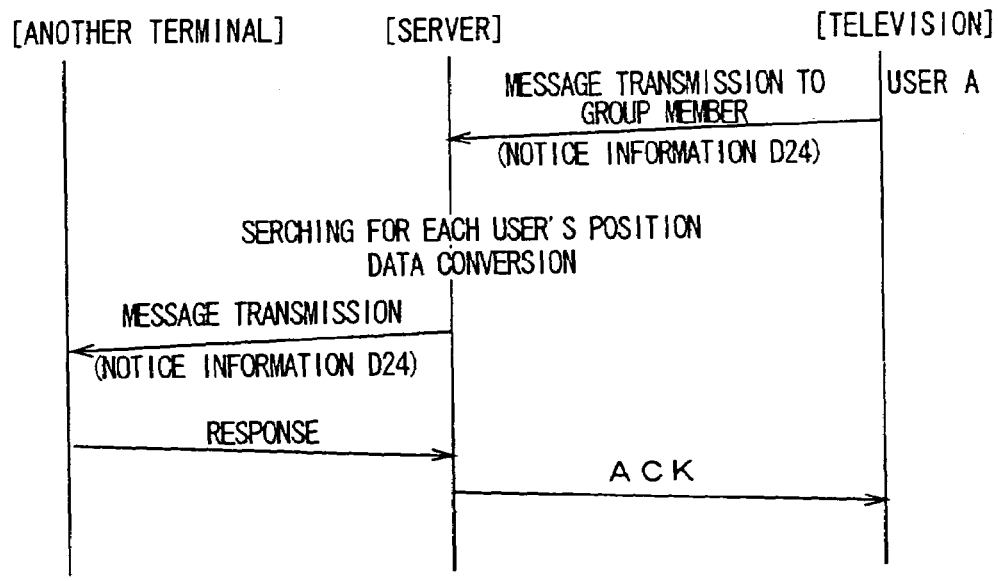
FIG. 14 is a schematic diagram showing the procedure for transmitting a message.

Then, as shown in FIG. 14, if a message to the group GP1 (hereinafter, this is referred to as notice information) D24 is sent from one of the members of the above group GP1 (i.e., user A) to the network server 22 along with the group ID designating the group GP1 and its password, the application processor 22C of the network server 22 searches for an operating terminal being used by each user of the group GP1 recorded in the database 22D. In this case, the application processor 22C recognizes that for example the user B is using the cellular phone 31 and the user C is using the personal computer 47 by the above search processing.

The application processor 22C supplies the notice information D24 sent from the user A to the other group members to a media converter 22E along with the information showing the type of a terminal device used by each group member who are the destinations (cellular phone 31, personal computer 47, . . . ), to convert the notice information D24 into a data format receivable in the terminal device used by each user (cellular phone 31, personal computer 47). For instance, the cellular phone 31 is more suitable for receiving speech data than character representation in its use, and the personal computer 47 is more suitable for receiving display data such as character or the like than speech data in its use.

Therefore, the media converter 22E transmits the notice information D24 to the cellular phone 31 used by the user B after converting into speech data. On the other hand, the media converter 22E transmits the notice information D24 to the user C after converting into a data format that is able to be displayed in the personal computer 47.

Each terminal device that received the notice information D24 replies a response signal to the network server 22. The network server 22 transmits an ACK (acknowledge) to the user A (television set 13) that is the sender of the notice information D24 responding to that, and notifies that each terminal device has received the notice information D24.

In this connection, when transmitting the notice information D24 from the user A to the terminal device being used by each group member (cellular phone 31, personal computer 47 or the like), if the network address translation (NAT), the small office/home office (SOHO), the dynamic host configuration protocol (DHCP), etc., are interposed between the terminal device and the network server 22, the network server 22 is hard to uniformly recognize the terminal only by address information such as an IP address or the like.

As a method to cope with such case, it may be applied that each group member previously records a telephone number to receive a call, and if the notice information D24 is arrived, the network server 22 notifies each group member the arrival of the notice information D24 by calling the telephone number previously recorded. Each group member who received this notice inserts the memory card 11$_x$ in the desired terminal device and requesting the notice information D24. Thereby, the network server 22 can transmit the notice information D24 to the terminal device having the memory card 11$_x$. As a result, each group member can immediately recognize the arrival as soon as the notice information (message) D24 directed to him is arrived to the network server 22.

On the other hand, as a method of transmitting the notice information D24 to the group members, it may be applied that the sending of the notice information D24 is notified from the network server 22 via the broadcast interface 23D (FIG. 1) and broadcast means for example by digital television broadcasting. In this case, the group ID is assigned to one channel of digital broadcasting, and in the terminal device having the memory card 11$_x$ of each group member in which the group ID has been written, if the broadcasted group ID agrees with the group ID in the memory card 11$_x$, the arrival of the notice information D24 to the network server 22 is received. Then, the user who received this notice can receive the notice information D24 by requesting of the network server 22 from each terminal device.

In this manner, each user recorded as a group member can send each group member the above notice information D24 being a message or the like to the group members or the notice that the above notice information D24 is reaching the network server 22 from the network server 22, only by specifying the group, without confirming the place where each group member is.

In this connection, FIG. 14 has dealt with the case of transferring a message in a group. However, the present invention is not only limited to the case of transferring information in a group but also it can be applied to transferring a message between other users recorded in the database 22D.

Figure 16:
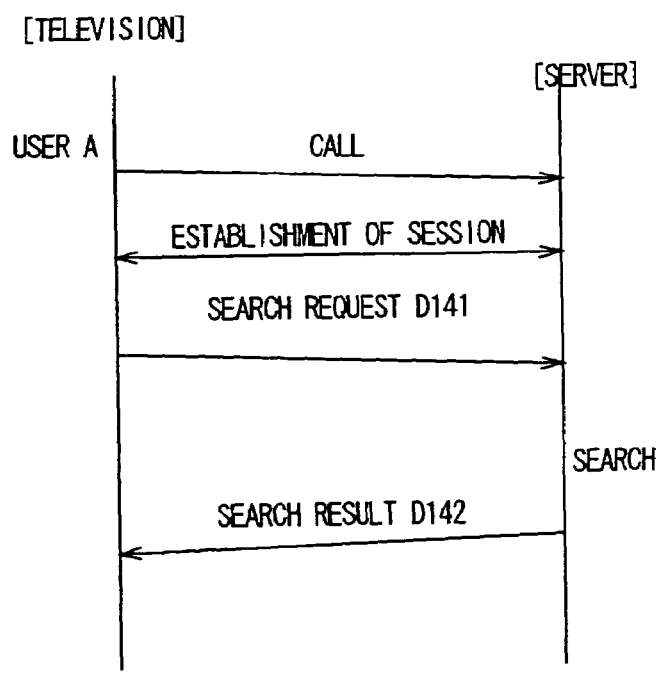
FIG. 16 is a schematic diagram showing the sequence of searching for user's using terminal.
Figure 15:
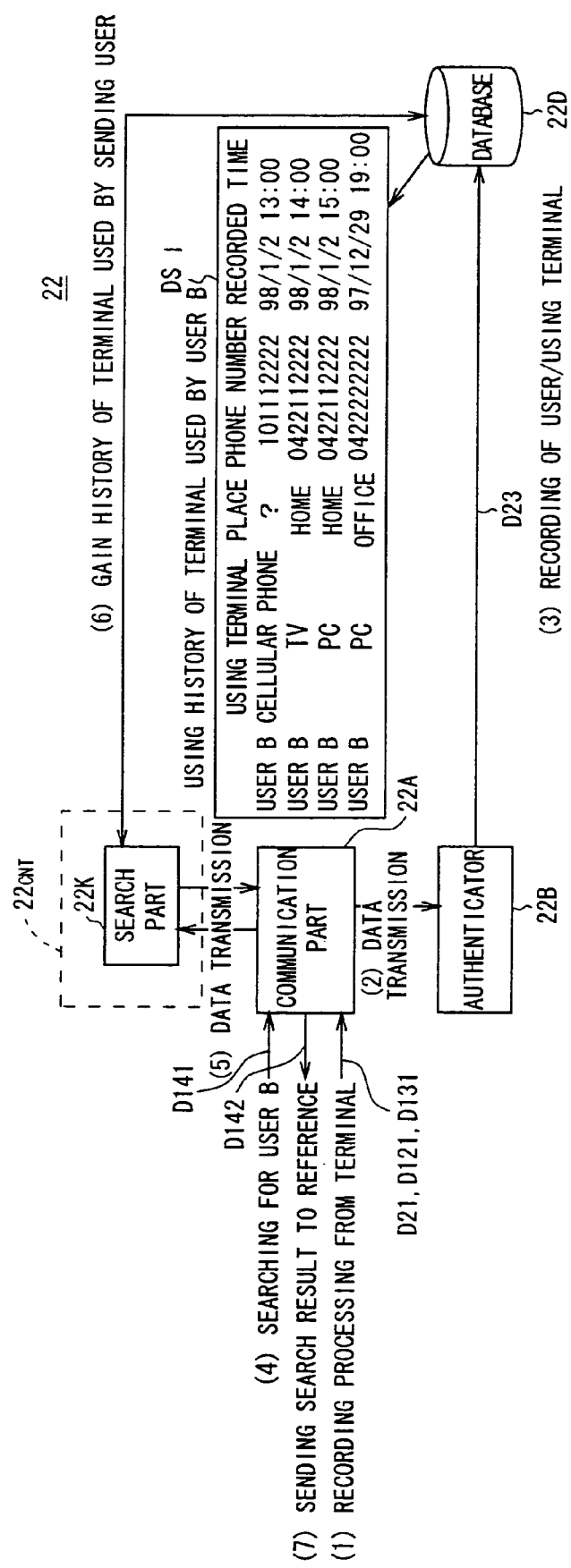
FIG. 15 is a block diagram explaining the operation for searching for user's using terminal.

Moreover, as shown in FIG. 15 in which the same reference numeral is added to the corresponding part of FIG. 7, in the state where the specified users (user A, user B, user C, user D, . . . ) have been registered as the group members of the group GP1 by the group forming request D122 and the group entry recording request D132 or the like among the combinations of the user and his operating terminal that have been recorded in the database 22D by the authentication request data D21, when one of the group members of the above group GP1 (e.g., user A) searches the network server 22 for the place where a specified group member (e.g., user B) is (his using terminal), as shown in FIG. 16, the user A calls the network server 22 and establishing the session between the television set 13 used by the user A at this time and the network server 22.

Then, the user A transmits a search request D141 which includes the group ID and the user ID of the user B to the network server 22 by operating the controller (not shown) of the television set 13. If the network server 22 receives the above search request D141 via the communication part 22A, the search part 22K of a controller $22_{CNT}$ searches the database 22D for the using history of the terminal of the user B who has been recorded as a group member responding to the above search request D141 based on the user ID of said user B. In this connection, in the database 22D, if each user changes a using terminal (that is, inserts the memory card $11_x$ in another terminal device), the combined data of the terminal device presently used by said user and the user is deleted from the record area about the using terminal. However, this using history will be stored in a history data area.

Accordingly, referring to FIG. 16, if the search request for the user B is transmitted to the network server 22 from the user A, in the above network server 22, the search part 22K searches the history data area in the database 22D for the using history of the terminal about the user B as well as reading out the information on the terminal device presently used from the record area about present using terminal and fetching this in the search part 22K (FIG. 15) as search data DS.

The search part 22K transmits thus fetched search data DS to the television set 13 being used by the user A who inquired that by transmitting the search request D141 as a searched result D142.

Thereby, the user A can confirm the place where the user B is (his using terminal) and his using history of terminal based on the terminal using history by the user B.

In this connection, in the case of FIG. 15, it has dealt with the case of searching for the user B recorded as a group member. However, the present invention is not only limited to this but also whereabouts of a user who is not registered as a group member and his terminal using history can be searched.

Here, the network server 22 can set an access right on a specified combination from among the combinations of each group member and all terminal devices used by them. The access right means a right, for example when the user A is using the personal computer 47, to access to the personal computer 47 being operated by said user A. The network server 22 can set the access right to the combination, for example, of the user A and the personal computer 47 etc., about that the right to access should be given to all of the other group members or that the right should be given to a part of the group members.

For example, when the user A is using the cellular phone 31, if a right to access to the cellular phone 31 used by said user A is set to a part of the group members among the other group members (e.g., only the user B and the user C), only the user B and the user C are allowed to access to the cellular phone 31 being used by the user A.

Figure 17:
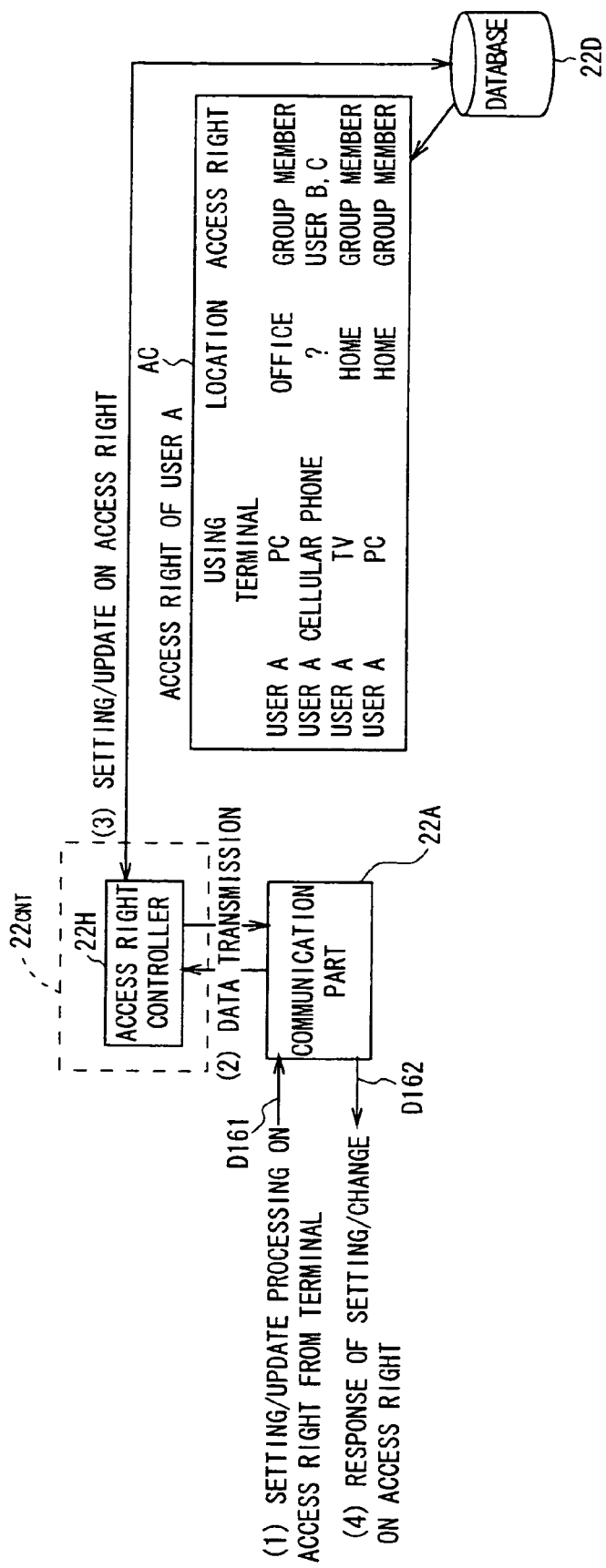
FIG. 17 is a block diagram explaining the operation for setting/updating an access right.
Figure 18:
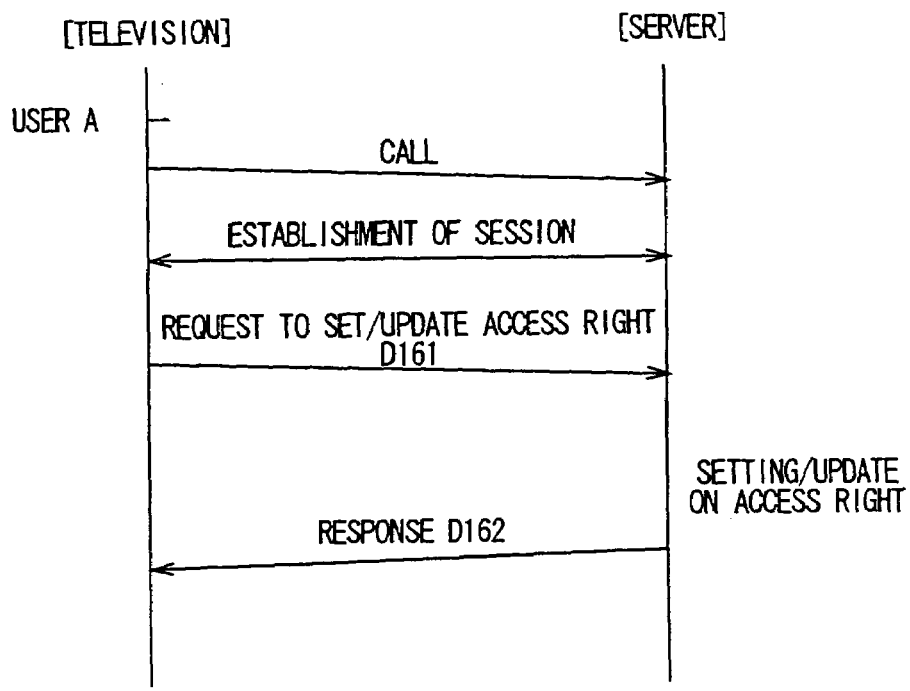
FIG. 18 is a schematic diagram showing the sequence of setting/updating the access right.

In this case, as shown in FIGS. 17 and 18 in which the same reference numeral is added to the corresponding part of FIG. 7, one of the group members (for example, the user A using the television set 13) operates the controller (not shown) of the television set 13 and calls the network server 22, and establishing the session between the television set 13 and the network server 22. Then, the user A transmits an access right setting or update request D161 from the television set 13 to the network server 22. In this access right setting or update request D161, the user ID and the group ID of the user A and his using terminal device, and the user ID of the person who set the access right (all or a part of the group members) at the time of using the terminal device are included.

If the network server 22 receives the access right setting or update request D161 with the communication part 22A, in the access right controller 22H of the controller $22_{CNT}$, setting or update of the access right is performed on the database 22D based on the access right setting or update request D161 from the user A. Thereby, in the database 22D, access right setting data AC on the user A (FIG. 17) is obtained. In this case, the setting of the access right in which all the group members can access to the personal computer 47 used by the user A, a part of the group members the user B and the user C can access to the cellular phone 31 used by the user A, all the group members can access to the television set 13 used by the user A, and all the group members can access to a personal computer in the home of the user A used by him (not shown) is performed.

In this manner, if the setting or the update of the access right is performed, the network server 22 notifies the television set 13 being used by the user A at this time the execution of the setting or the update of the access right by a setting or an update response D162. Then, the setting or the update processing of the access right is finished.

Also with respect to the update processing of access right, the group members can respectively change their own access right in similar manner to the access right setting processing.

On the other hand, in FIGS. 17 and 18, the group members has respectively set their own access right. However, the present invention is not only limited to this but also the group former (e.g., the user A) may set the access right of another group member.

Moreover, it is not only limited to the setting or update of the access right in the group. In short, also users recorded in the network server 22 can respectively set or update their own access right.

If an access right is set in this manner, the other users than the users (user B and user C) who have been given the right to the combination of the user and his using terminal to which the above access right has been set (e.g., the combination of the user A and his using cellular phone in FIG. 18) are inhibited to access to the terminal device.

Figure 20:
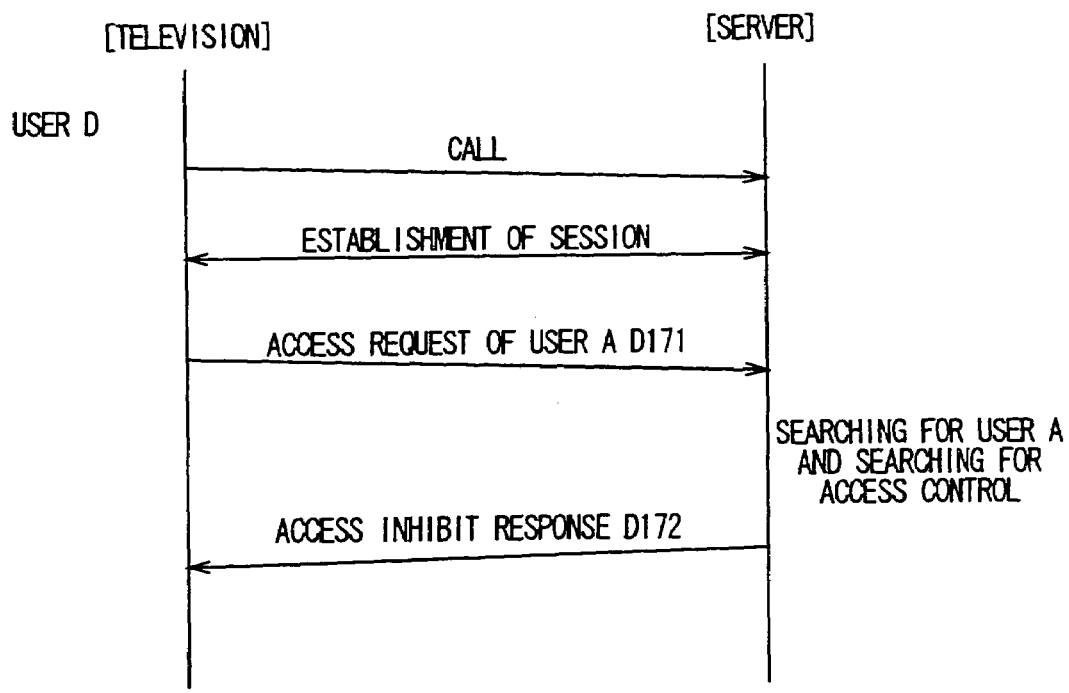
FIG. 20 is a schematic diagram showing the access control sequence.
Figure 19:
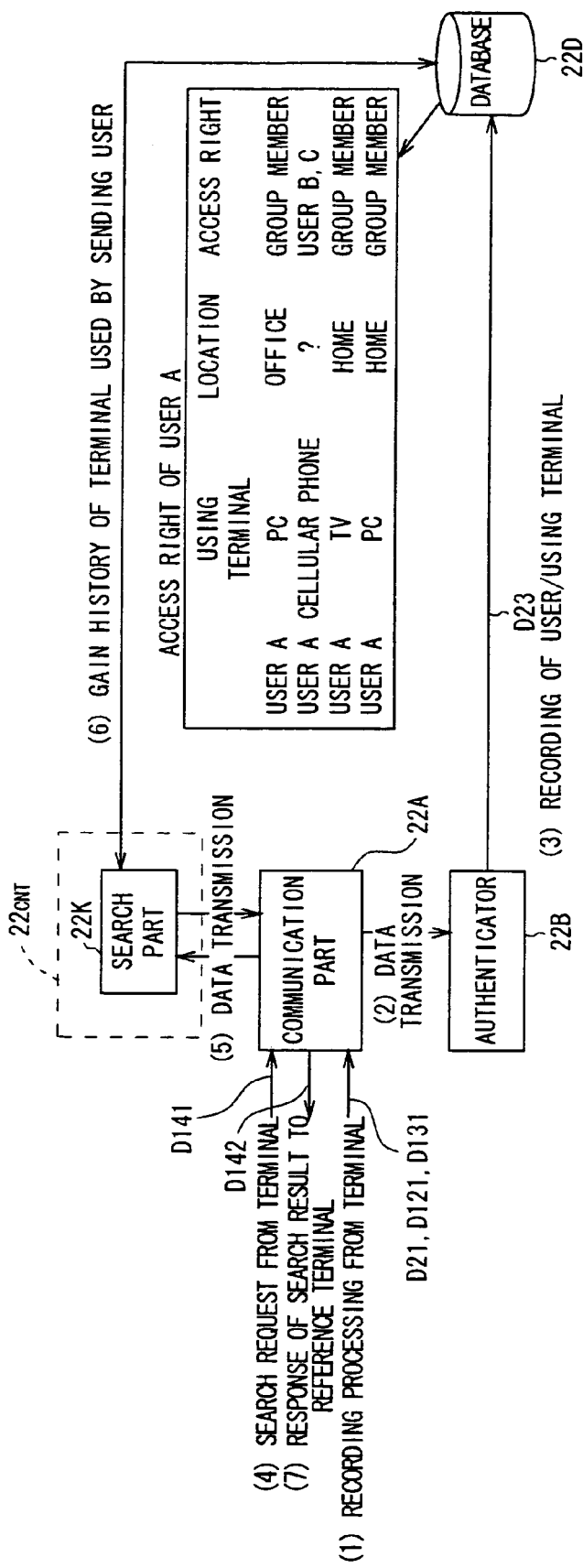
FIG. 19 is a block diagram explaining the operation for access control processing.

For instance, as shown in FIGS. 19 and 20, if a user D being a group member transmits an access request D171 which includes the user ID and the group ID of the user A to the user A to whom the setting of the access right has done to the network server 22, the search part 22K of the network server 22 performs the whereabouts search of the user A described above with reference to FIG. 15 according to the above access request D171, and at the same time, searches for the access right setting data AC described above with reference to FIG. 17. As a result of the whereabouts search, if the whereabouts of the user A (his using terminal device) is a cellular phone, and also as a search result of the access right setting data, if the right to access to the above cellular phone during the user A is using the cellular phone is given to only the user B and the user C, the search part 22K does not allow the user D to access to the cellular phone being used by the user A and transmits an access inhibit response D172 to the personal computer being used by the user D.

Thereby, the user D to whom the access right to the combination of the user A and the cellular phone is not set is inhibited to access to the cellular phone being used by the user A.

According to the above configuration, the network server 22 has recorded the plural users as one group. Each user in the above group can send/receive the various notice information (messages) D24 in the group via the network server 22 only by specifying the group ID and the password of the group.

For instance, if the user A transmits a message to the group members to the network server 22, the network server 22 searches the database 22D for the other users (user B, user C, . . . ) being the other group members, converts the message from the user A into a data format usable in each using terminal and transmits this to where each user is (using terminal) according to the above searched result. In this case, even if the terminal device used by each user (user B, user C, . . . ) is not connected to the network server 22, the network server 22 can access to these terminal devices from the searched result and can transmit the message from the user A.

Accordingly, each user being one of the group members can send each group member the above message only by transmitting the message in which the group ID is specified to the network server 22, without grasping the mutual whereabouts.

According to the above configuration, a message to a user recorded in the network server 22 can be surely reached said user.

In the aforementioned embodiment, it has dealt with the case where the place where a user is (his using terminal) is recorded in the network server 22 at the timing of inserting the memory card $11_x$ when the user uses each terminal device. However, the present invention is not only limited to this but also for example in a network system interposed by the dynamic host configuration protocol (DHCP), since number of terminal devices changes, each terminal device may always notify the network server 22 the latest number of the terminal device by performing polling.

In the aforementioned embodiment, it has dealt with the case where the notice information (message) D24 directed to each user is evenly reached each user. However, the present invention is not only limited to this but also the notice information having higher priority may be reached the destination prior to other notice information by previously adding the priority to the notice information, or the notice information transmitted from the user having higher priority may be reached the destination or the notice information may be reached the user having higher priority prior to the others by previously adding the priority to the users to transmit the notice information or the users to receive the notice information.

Figure 21:
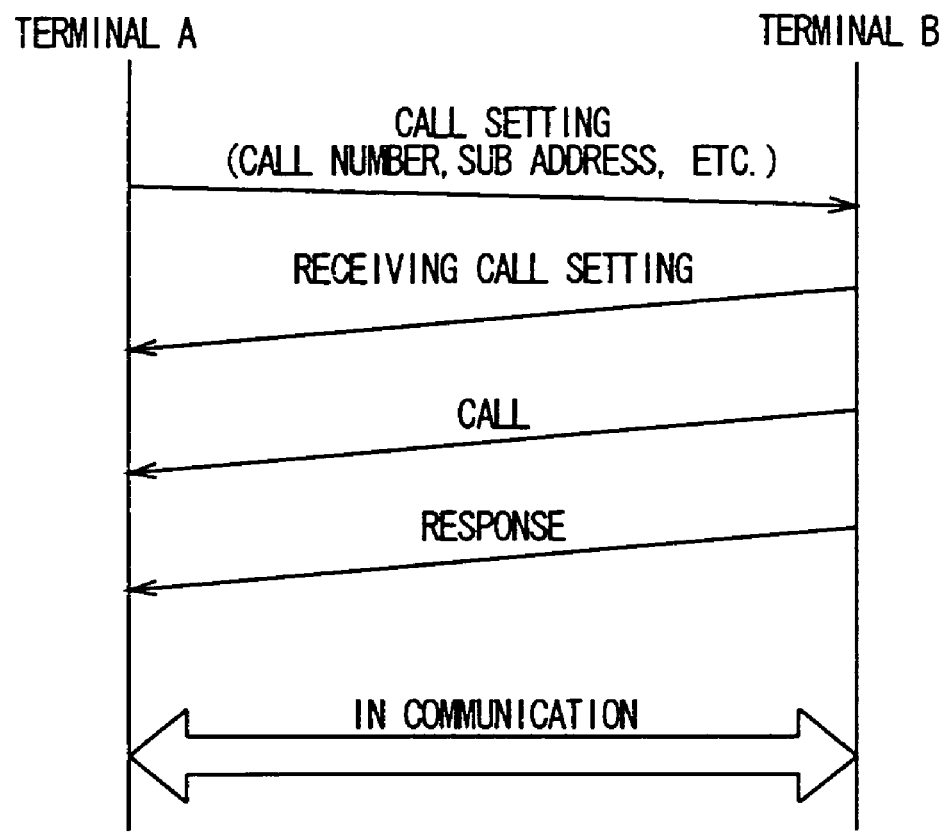
FIG. 21 is a schematic diagram showing the sending sequence in the ISDN and the PHS in another embodiment.

In the aforementioned embodiment, it has dealt with the case where as a method of transmitting data from the network server 22 to each terminal device, the data is transmitted after the line is connected. However, the present invention is not only limited to this but also for example as shown in FIG. 21, the arrival of the notice information to the network server 22 may be notified using an outband signal (signal till a call, e.g., call control or the like) in the integrated services digital network (ISDN), the personal handyphone system (PHS), etc., or by means of a character transmission service used in radio communication or terrestrial wave broadcast means, satellite broadcast means, etc., in digital broadcasting or the like.

In this connection, information to be put on the outband signal is prescribed by the standard of radio communication. In the ISDN, the data called user information is included in call setting. This information is communicated between a server and a terminal by peer to peer. On the other hand, in the PHS, subaddress information is information to be communicated by peer to peer. By putting the notice information on them, an arrival of the information from the server to the terminal can be notified. Since the outband signal does not take any communication cost, the working cost of the network server 22 can be reduced.

In the aforementioned embodiment, it has dealt with the case where the communication between the network server 22 and a terminal device is performed via a communication line such as a telephone line or the like. However, the present invention is not only limited to this but also if the terminal device can communicate with a power line via an outlet, the network server 22 can transmit the notice information (message) and the notice that the above notice information has arrived to each terminal device by performing a transmission/receiving via the above power line.

Furthermore, in the aforementioned embodiment, it has dealt with the case where the memory card $11_x$ having the memory 11A is used as external storage means. However, the present invention is not only limited to this but also a memory card mounting a CPU may be used. Moreover, the external storage means is not only limited to in the card shape but also many storage means in various forms can be applied.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A network server connected to a terminal device via prescribed communication means, comprising:

receiving means for receiving an authentication request including information for user authentication and information about terminal specification in response to said terminal device detecting insertion of a memory device storing said user authentication information, wherein said memory device is divided into areas designated by a memory map, one of said areas containing personal information relating to a user of the memory device and another of said areas containing each terminal information relating to a specific kind of said terminal device;

recording means for recording said user authentication information in said server in association with said information about terminal specification for future communication with said terminal device associated with said information about terminal specification when said user authentication information is authenticated;

transmission means for converting information to be transmitted to said terminal device into conformed information conformed to said terminal device based on said information about terminal specification, and transmitting said conformed information to said terminal device; and group forming means for forming a group of a plurality of users by producing a group ID in response to a group forming request transmitted by said terminal device, for recording an other terminal device into said group in response to receiving said group ID from said other terminal device, and for transmitting information sent from a user belonging to said group to another user belonging to said group.

* * * * *